United States Patent
Joung

(10) Patent No.: US 7,926,364 B2
(45) Date of Patent: Apr. 19, 2011

(54) TACTILE SENSOR

(75) Inventor: Il-Kweon Joung, Seongnam-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 201 days.

(21) Appl. No.: 12/368,445

(22) Filed: Feb. 10, 2009

(65) Prior Publication Data

US 2010/0050784 A1    Mar. 4, 2010

(30) Foreign Application Priority Data

Sep. 4, 2008  (KR) .................. 10-2008-0087235

(51) Int. Cl.
 *G01D 7/00*  (2006.01)
 *G01L 1/22*  (2006.01)
(52) U.S. Cl. ................................. 73/862.046
(58) Field of Classification Search .............. 73/862.041–862.046
 See application file for complete search history.

(56) References Cited

U.S. PATENT DOCUMENTS

| | | | | |
|---|---|---|---|---|
| 5,606,136 A * | 2/1997 | Kropp | ..................... | 73/862.046 |
| 6,586,831 B2 * | 7/2003 | Gooch et al. | ................... | 257/704 |
| 6,910,383 B2 * | 6/2005 | Ou et al. | ......................... | 73/754 |
| 7,337,681 B2 * | 3/2008 | Nikaido et al. | .......... | 73/862.541 |
| 2004/0118213 A1 * | 6/2004 | Ou et al. | ......................... | 73/754 |

FOREIGN PATENT DOCUMENTS

| | | |
|---|---|---|
| JP | 3105552 | 9/2000 |
| KR | 10-2006-0021171 | 3/2006 |
| KR | 10-2007-0105579 | 10/2007 |
| KR | 10-0812318 | 3/2008 |

OTHER PUBLICATIONS

Korean Office Action, with Partial English Translation, issued in Korean Patent Application No. 10-2008-0087235, dated Sep. 3, 2010.

* cited by examiner

*Primary Examiner* — Max Noori
(74) *Attorney, Agent, or Firm* — McDermott Will & Emery LLP

(57) ABSTRACT

A tactile sensor includes: a circuit board; a plurality of unit electrode pads; and a pressure sensing film, in which the circuit board can include: a first circuit pattern, implemented by electrically connecting unit electrode pads disposed in a same column among the plurality of unit electrode pads arranged in a 2-dimensional configuration; a second circuit pattern, implemented by electrically connecting unit electrode pads disposed in a same row among the plurality of unit electrode pads arranged in a 2-dimensional configuration; a third circuit pattern, implemented by electrically connecting unit electrode pads disposed in a same section among the plurality of unit electrode pads arranged in a 2-dimensional configuration, if assuming that the entire area in which the plurality of unit electrode pads are arranged is divided by sections.

13 Claims, 22 Drawing Sheets

FIG. 2A
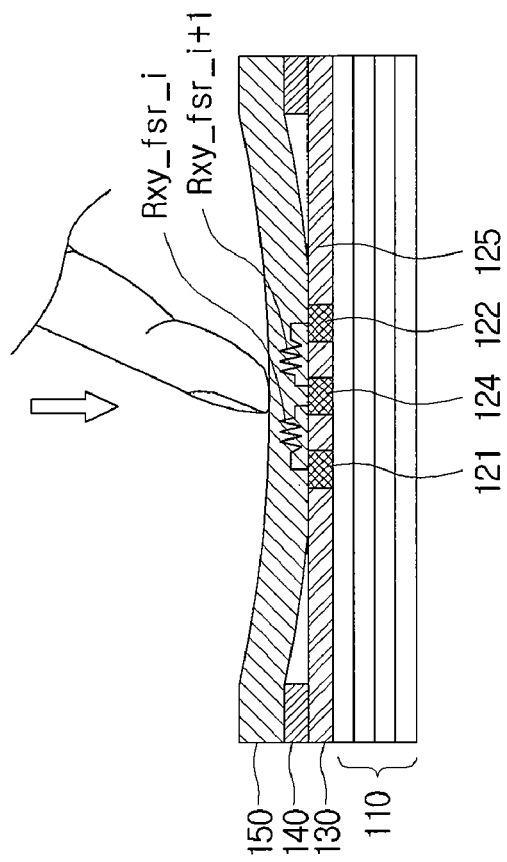
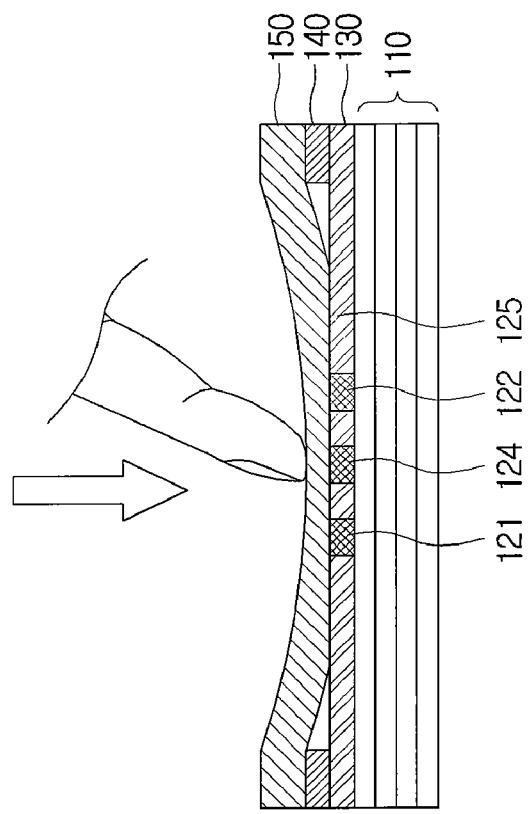

FIG. 2B
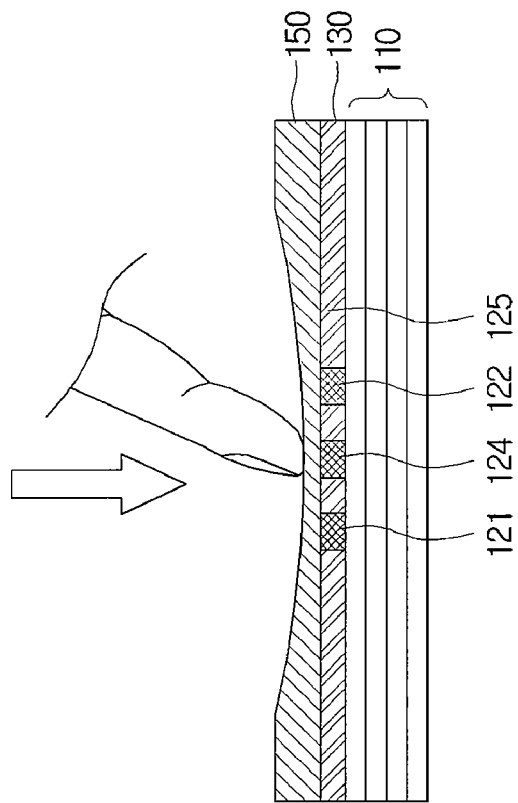
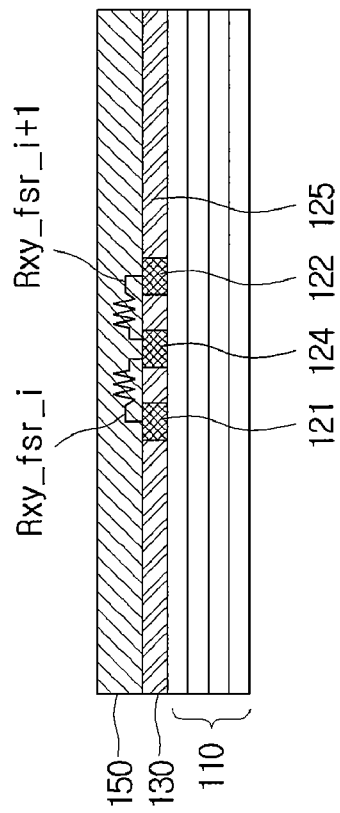

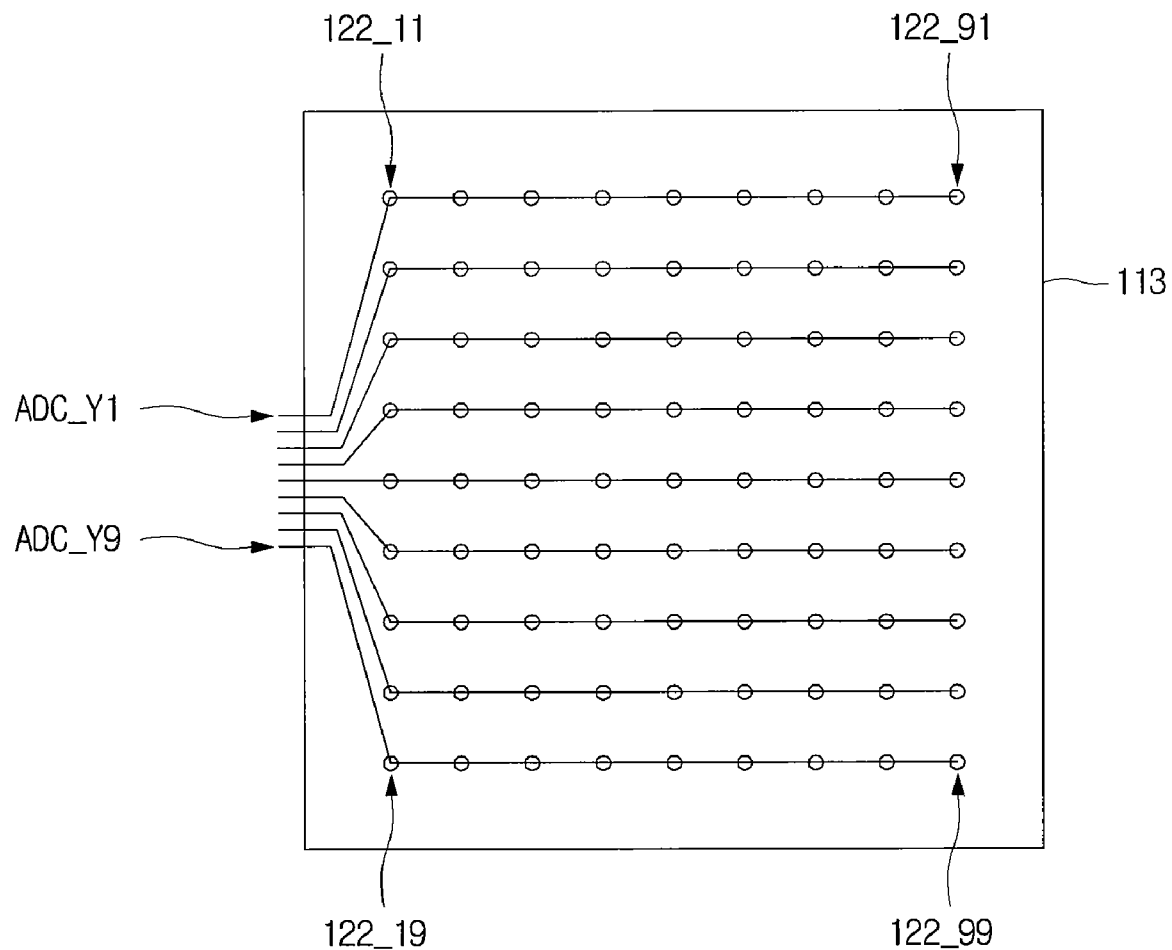

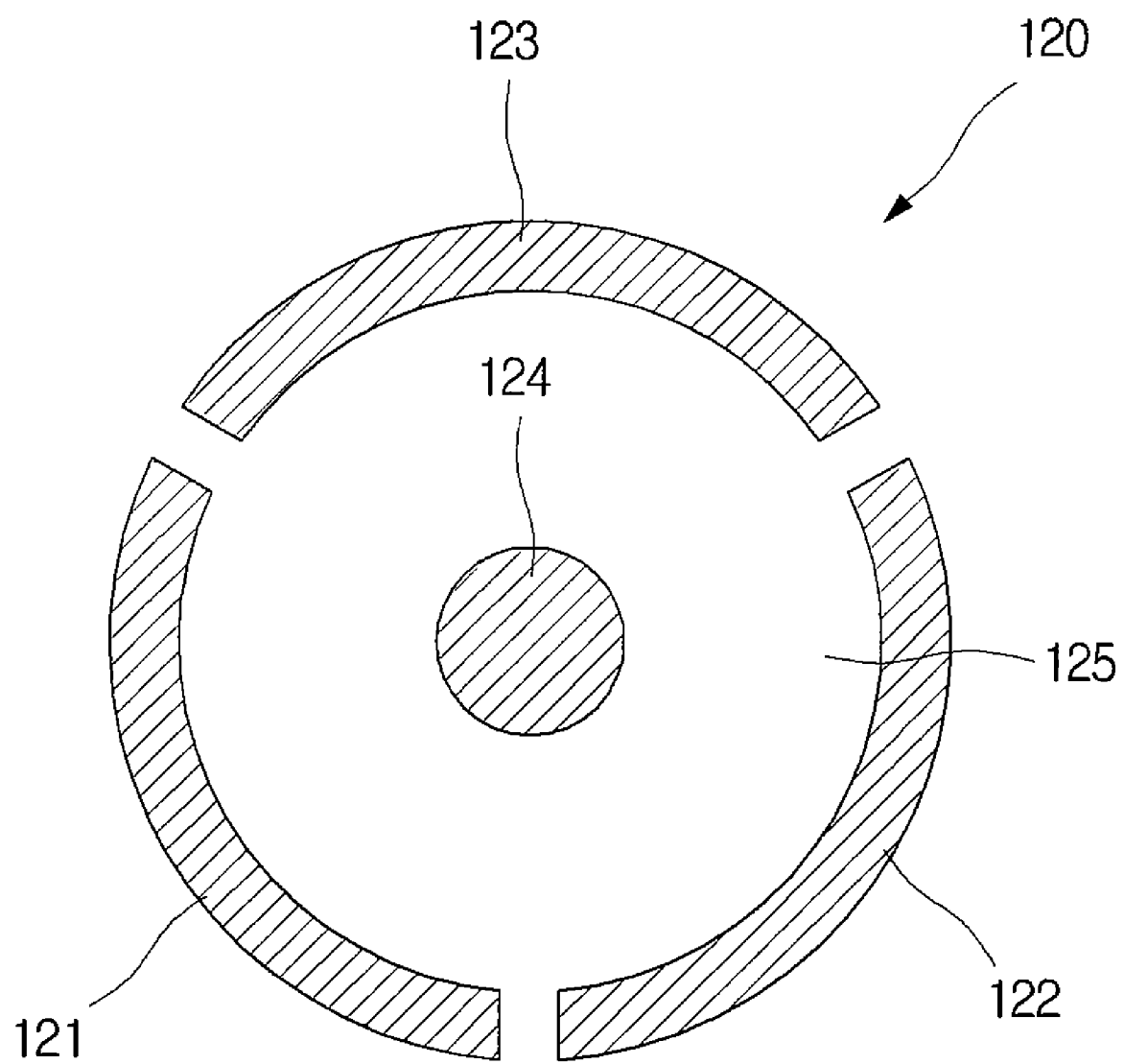

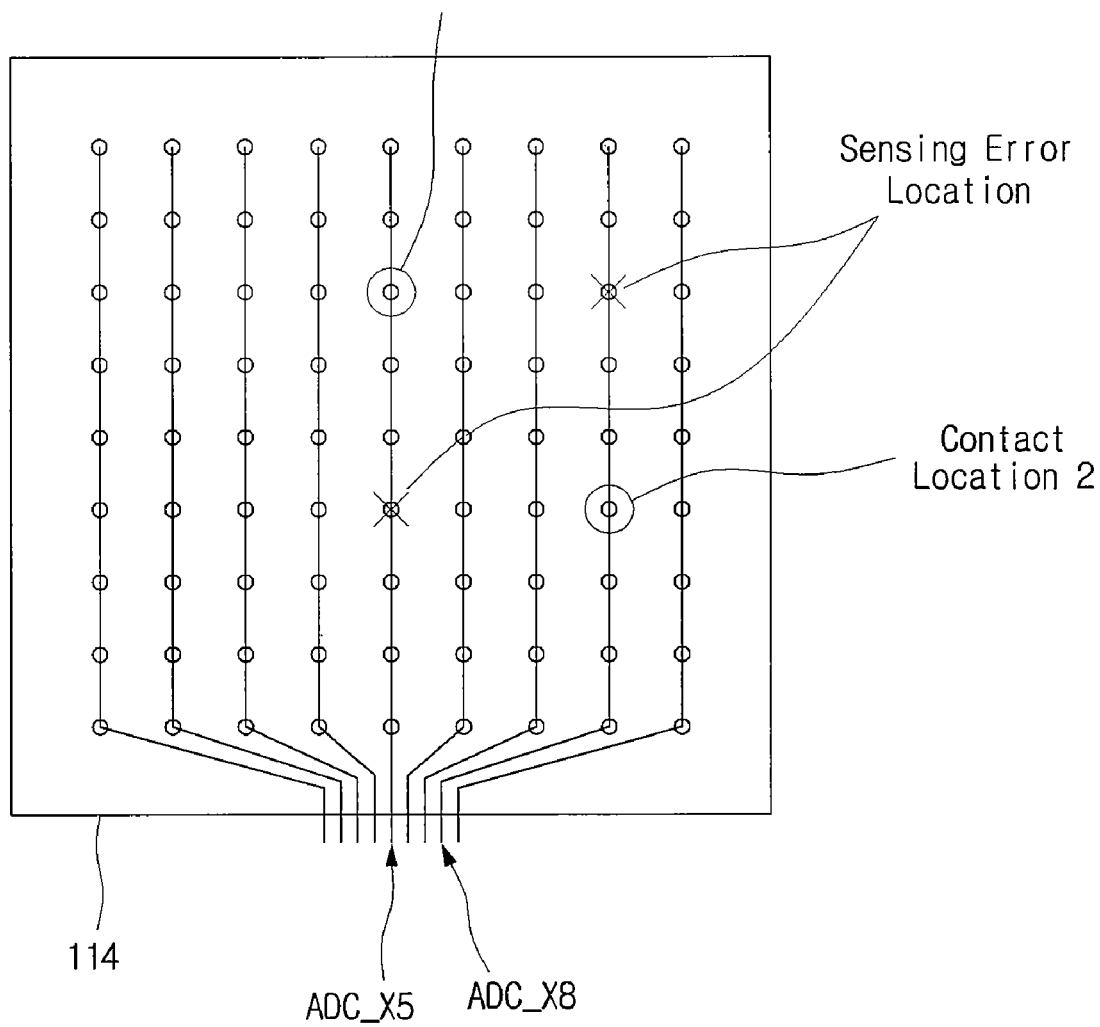

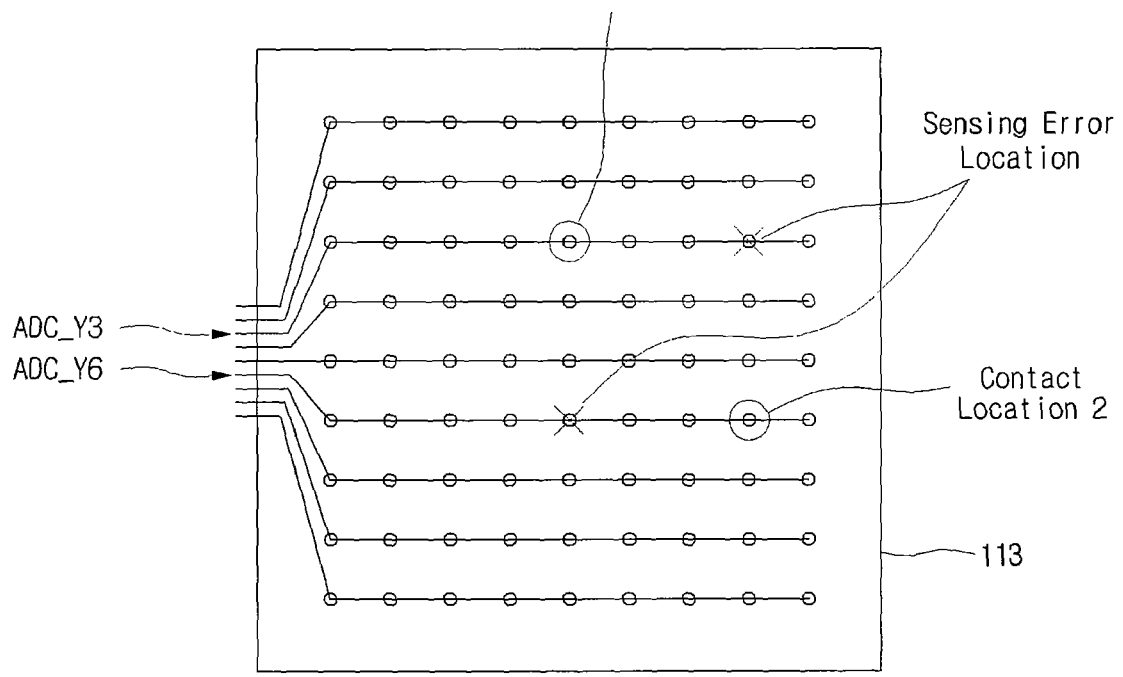

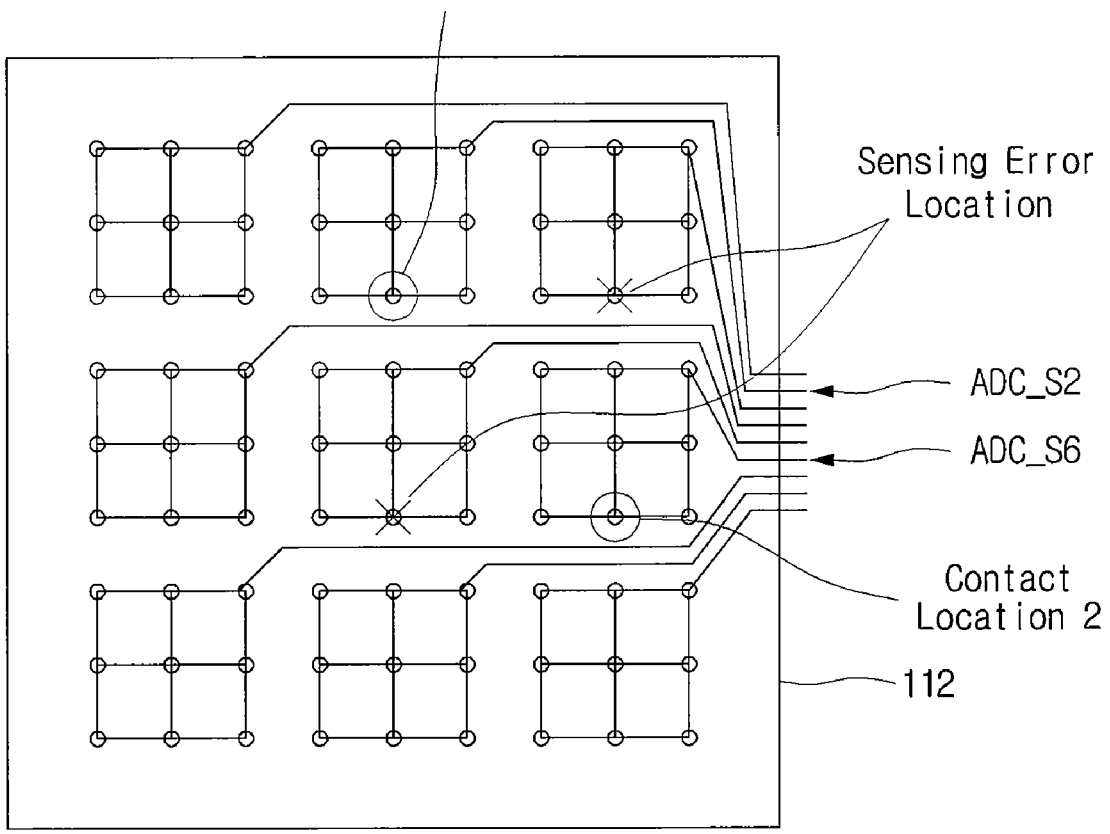

TACTILE SENSOR

CROSS-REFERENCE TO RELATED APPLICATIONS

This application claims the benefit of Korean Patent Application No. 10-2008-0087235, filed with the Korean Intellectual Property Office on Sep. 4, 2008, the disclosure of which is incorporated herein by reference in its entirety.

BACKGROUND

1. Technical Field

The present invention relates to a tactile sensing technology, more particularly to a tactile sensor.

2. Description of the Related Art

A human hand is an extremely important part that senses the touch among various human senses. The sense of touch that humans possess includes a variety of information, such as a contact force, roughness of a surface in contact and a temperature of a surface in contact. As a result, if there is a device that can feel the sense of touch, like the human hand, the use of the device can be used in various fields.

Not only is the tactile sensing technology used in robots and medical devices, but it is also used in input devices of display. In addition to the above, this promising technology can be widely used for new applications in various fields. In order to have the similar sense of touch that humans possess, the capability to sense how hard one is touching when contacted and the presence and location of a touch is an important element required in the tactile sensing technology.

However, a tactile sensor in accordance with the conventional technology needs a large number of signal lines to accurately detect a contact force and the location of a touch described above, thereby complicating its signal throughput.

Therefore, in order to improve the flexibility of the tactile sensing technology, it is most urgent to develop a tactile sensor that can be easily produced and reduce its throughput.

SUMMARY

The present invention provides a tactile sensor that simplifies a pattern structure and has the capability to sense how hard one is touching and the presence and location of a touch. The present invention also provides a tactile sensor that can implement the capability to sense multiple touch points while detecting the contact location.

An aspect of the present invention provides a tactile sensor. The tactile sensor in accordance with an embodiment of the present invention can include: a circuit board; a plurality of unit electrode pads, which are arranged in a 2-dimensional configuration on one surface of an upper part of the circuit board; and a pressure sensing film, which is disposed on an upper part of the plurality of 2-dimensionally arranged unit electrode pads, in which the circuit board can include: a first circuit pattern, implemented by electrically connecting unit electrode pads disposed in a same column among the plurality of unit electrode pads arranged in a 2-dimensional configuration; a second circuit pattern, implemented by electrically connecting unit electrode pads disposed in a same row among the plurality of unit electrode pads arranged in a 2-dimensional configuration; a third circuit pattern, implemented by electrically connecting unit electrode pads disposed in a same section among the plurality of unit electrode pads arranged in a 2-dimensional configuration, if assuming that the entire area in which the plurality of unit electrode pads are arranged is divided by sections.

The plurality of unit electrode pads can include a first electrode to a fourth electrode that are electrically separated from one another, whereas any three selected from the group consisting of the first to fourth electrodes in the plurality of unit electrode pads are connected with the first to third circuit patterns, respectively.

If electricity is supplied to the three electrodes connected with the first to third circuit patterns selected from the group consisting of the first to fourth electrodes constituting the unit electrode pad, a remaining electrode is grounded.

The circuit board further can further include a fourth circuit pattern, which electrically connects electrodes being connected to a ground among the plurality of unit electrode pads arranged in a 2-dimensional configuration.

The three electrodes can have the same shape and volume and be disposed by being apart from the remaining one by a same distance, in which the three electrodes are connected with the first to third circuit patterns among the first to fourth electrodes constituting the unit electrode pad. In addition, the three electrodes can be disposed such that the three electrodes are circularly symmetric with respect to the remaining electrode, in which the three electrodes are connected with the first to third circuit patterns among the first to fourth electrodes constituting the unit electrode pad.

The first to third circuit patterns can be formed on different layers from one another in the circuit board.

The unit electrode pads can be arranged in an N×N matrix configuration on a same surface.

The plurality of unit electrode pads can be arranged to be spaced evenly.

The entire area in which the plurality of unit electrode pads are arranged can be virtually divided such that each of the sections has an equal area in order to implement the third circuit pattern.

An area of one of the sections can be set to correspond to an effective contact area of an object being in contact with a surface of the pressure sensing film.

The pressure sensing film can be disposed by a spacer to be spaced apart above the plurality of unit electrode pads, while not in contact.

The pressure sensing film can be disposed to face the plurality of unit electrode pads directly, even while not in contact.

The pressure sensing film can be formed as a force sensing resistor.

Additional aspects and advantages of the present invention will be set forth in part in the description which follows, and in part will be obvious from the description, or may be learned by practice of the invention.

BRIEF DESCRIPTION OF THE DRAWINGS

FIG. 2A illustrates the tactile sensor illustrated in FIG. 1 when it is in contact.

FIG. 2B is a cross sectional view briefly illustrating a tactile sensor being in contact and without being in contact in accordance with another embodiment of the present invention.

FIG. 3C illustrates an example of a Y axial circuit pattern implemented on a circuit board in a tactile sensor in accordance with an embodiment of the present invention.

FIG. 4 illustrates an unit electrode pad in accordance with an embodiment of the present invention.

FIGS. 8A to 8C illustrate how multi-sensing is possible through a sectional circuit pattern in a tactile sensor in accordance with the present invention.

DETAILED DESCRIPTION

Figure 1:
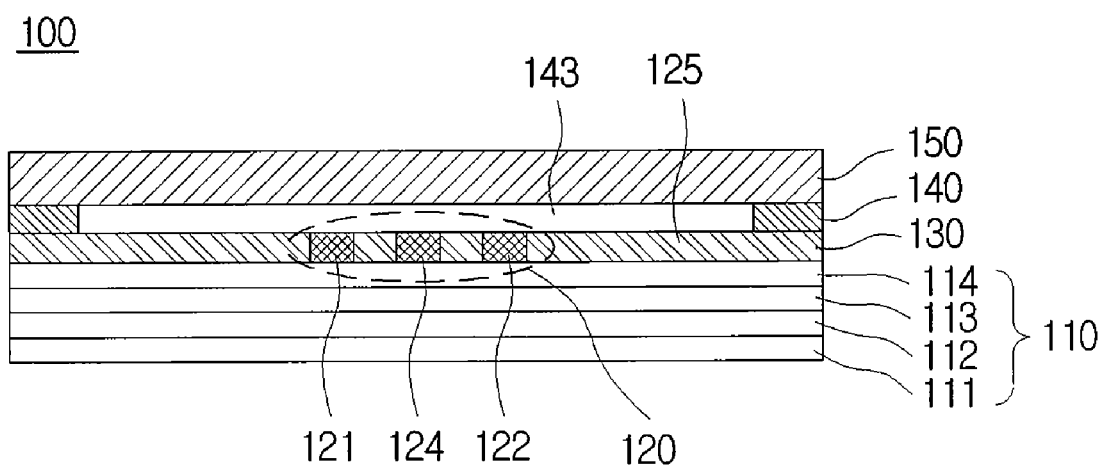
FIG. 1 is a cross sectional view briefly illustrating a tactile sensor without being in contact in accordance with an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Certain embodiments of the present invention will be described below in detail with reference to the accompanying drawings. For better understanding overall in describing aspects of the present invention, the same reference numerals are used for the same means, regardless of the figure number.

FIG. 1 is a cross sectional view briefly illustrating a tactile sensor without being in contact in accordance with an embodiment of the present invention, and FIG. 2A illustrates the tactile sensor illustrated in FIG. 1 when it is in contact. FIG. 2B is a cross sectional view briefly illustrating a tactile sensor being in contact and without being in contact in accordance with another embodiment of the present invention.

FIGS. 1 to 2B do not illustrate the fall cross sectional view of a tactile sensor in accordance with the present invention. For better understanding, it shall be evident that the drawings are cross sectional views briefly illustrating part of an unit electrode pad 120 on an electrode layer 130.

Below, a tactile sensor in accordance with certain embodiments of the present invention will be described with reference to FIGS. 3A to 8C.

Referring to FIG. 1, a tactile sensor 100 in accordance with an embodiment of the present invention includes a circuit board 110, an electrode layer 130, which is disposed on an upper surface of the circuit board 110, and a pressure sensing film 150, which is disposed on an upper part of the electrode layer 130. The same goes for a tactile sensor in accordance with another embodiment of the present invention illustrated on the left drawing in FIG. 2B. Moreover, it shall be apparent without a further description that a protective film, for example, a dielectric film, for protecting the pressure sensing film 150 or the sensor can be prepared on the pressure sensing film 150 even though it is not illustrated in FIGS. 1 to 2B.

For better understanding on a tactile sensor, how the tactile sensor in accordance with the embodiments of the present invention detects the location of a touch will be briefly described below.

First, if a surface of the sensor is not in contact, the tactile sensor 100 in accordance with an embodiment of the present invention allows the pressure sensing film 150 to disposed by a spacer 140 to be spaced apart above the unit electrode pads 120 on the electrode layer 130, as illustrated in FIG. 1. In other words, the spacer 140 illustrated in FIG. 1 allows the electrode layer 130 and the pressure sensing film 150 to be spaced apart from each other by an air space 143 that is positioned between the electrode layer 130 and the pressure sensing film 150, while not in contact. Therefore, electrodes 121, 122 and 124 constituting the unit electrode pad 120 are electrically separated from one another by a dielectric substance 125 that interposes itself between the electrodes 121, 122 and 124.

Here, the spacer 140 can be equipped either between each of the unit electrode pads, or on an outer edge of the entire tactile sensor.

Then, if the surface of the sensor is contacted, the pressure sensing film 150 is pressed down by the pressing force (pressure), and thus a unit electrode pad 120 corresponding with the contact area in the electrode layer 130 becomes contacted, as illustrated in FIG. 2A. In the case above, the electrodes 121, 122 and 124 constituting the unit electrode pad 120 are electrically connected with one another through a resistant substance (reference to Rxy_fsr_i and Rxy_fsr_i+1 in FIG. 2A) of the pressure sensing film 150. Here, a change in the voltage, generated between the electrically connected electrodes (in the case of FIG. 2A, between the electrodes 121 and 124, and the electrodes 122 and 124), can be detected through a sensing circuit (reference to FIGS. 6A to 6C or FIGS. 7A to 7C) that is electrically connected with the electrodes 121, 122 and 124, allowing the tactile sensor to sense a location at which physical contact occurs.

The pressure sensing film 150 can be made of a substance that can change its resistance value in accordance with a contact force applied when physical contact occurs at a surface of the pressure sensing film 150. A force sensing resistor (FSR) is a widely announced substance that can change its resistance value in accordance with such a contact force. The force sensing resistor (FSR) is a conductive elastic body, like a polymer film, that reduces its resistance value while its contact force, i.e., when a contact area between two objects (or an object and a surface) increases, in contrast, increases.

Accordingly, if the pressure sensing film 150 is fabricated through the use of the force sensing resistor (FSR), not only a contact location at which two things contact is detected but also the size of a contact force can be detected. For example, if a greater pressing force is applied to the same contact location, as shown in the right drawing of FIG. 2A, the value of its resistance elements presented by the pressure sensing film 150 can be less than those of the case in the left drawing of FIG. 2A. As a result, when the electrodes are electrically connected from one another, a voltage detected by the sensing circuit can be varied. By using a proportional linear relationship described above, a change in the size of a contact force can be detected precisely.

The sensing principle of a tactile sensor in accordance with another embodiment of the present invention illustrated in FIG. 2B is almost the same as that of the tactile sensor described above, as illustrated in FIGS. 1 and 2A. However, a difference between the two sensors is that the tactile sensor in accordance with another embodiment of the present invention does not have the spacer 140, so that the electrodes without being in contact are electrically connected with one another in advance, as illustrated in the left drawing of FIG. 2B. In this case, a certain value of voltage can be continuously detected through the sensing circuit without being in contact, and then it can be determined that physical contact occurs when a change in the value of voltage is detected. Other than the case described above, i.e., the principle of detecting a change in the size of a contact force by using the proportional linear relationship, are the same as that illustrated in FIGS. 1 and 2A.

However, the sensing principle of a tactile sensor described above is not much different from conventional technologies, and the key features of the tactile sensor in accordance with the present invention are as follows: the shape of an electrode configuration, the configuration of the detection circuit and the configuration of a circuit pattern, which corresponds to the detection circuit and is implemented on a circuit board. Hereinafter, the key features will be described in more detail, but the tactile sensor (i.e., the two electrodes are electrically connected only when contacted) illustrated in FIGS. 1 and 2A will be mainly described.

First, the configuration of the electrode layer 130 of the tactile sensor in accordance with the embodiments of the present invention will be described. A plurality of unit electrode pads 120 can be arranged in a 2-dimensional configuration on the electrode layer 130. The dielectric substance 125 is interposed between each of the plurality of unit electrode pads 120 and each of the electrodes constituting one unit electrode pad 120, electrically insulating each of them.

Referring to FIG. 4, one unit electrode pad 120 includes a total of four electrodes. For better understanding, the reference numerals 121 to 124 are named first to forth electrodes, respectively hereinafter. In the case of FIGS. 1 to 2B, however, there are only three electrodes illustrated and the reason is that the drawings are cross sectional views only illustrating one section of a tactile sensor.

The unit electrode pad 120 is arranged such that the remaining electrodes 121, 122 and 123 are circular symmetrically positioned by the forth electrode 124 at a center. That is, while the first to third electrodes 121, 122 and 123 are in a same form and size, each of them is spaced from the forth electrode 124 so that there is a same distance between each of the electrodes and the forth electrode 124.

The reason why any three of the electrodes are circular symmetrically arranged from a remaining electrode, or any three of the electrodes are in a same form and size but spaced from a remaining electrode in a same distance, is that a contact area of the pressure sensing film 150 being contacted with each of the electrodes 121, 122, 123 and 124 is needed to be the same in size when the tactile sensor is in contact. Nevertheless, what has just been described above is not always required to detect a contact location, but if the contact areas are equalized in size, each resistance value between the electrodes (in the case of FIG. 4, between the first electrode 121 and the forth electrode 124, the second electrode 122 and the forth electrode 124, and the third electrode 123 and the fourth electrode 124) can have almost the same value, thereby simplifying a determining process and a circuit for calculating the magnitude of a contact force.

Figure 5A:
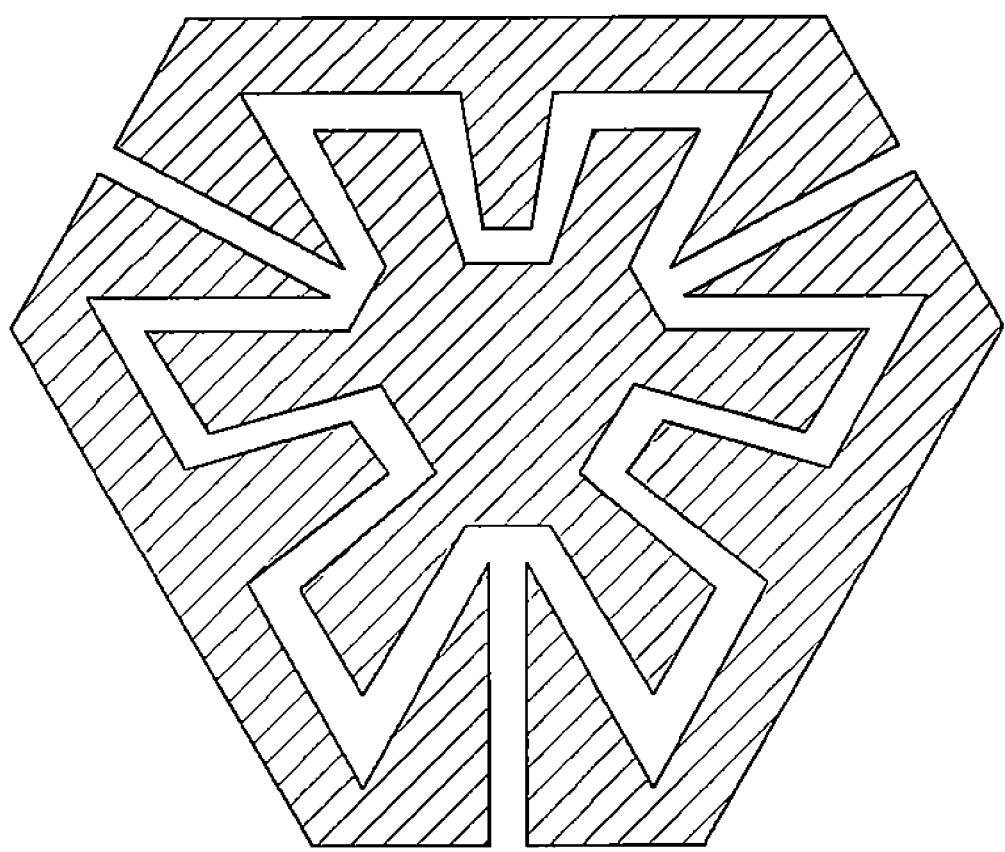
FIGS. 5A to 5D illustrate a variety of examples of unit electrode pads that are applicable to the present invention.
Figure 5B:
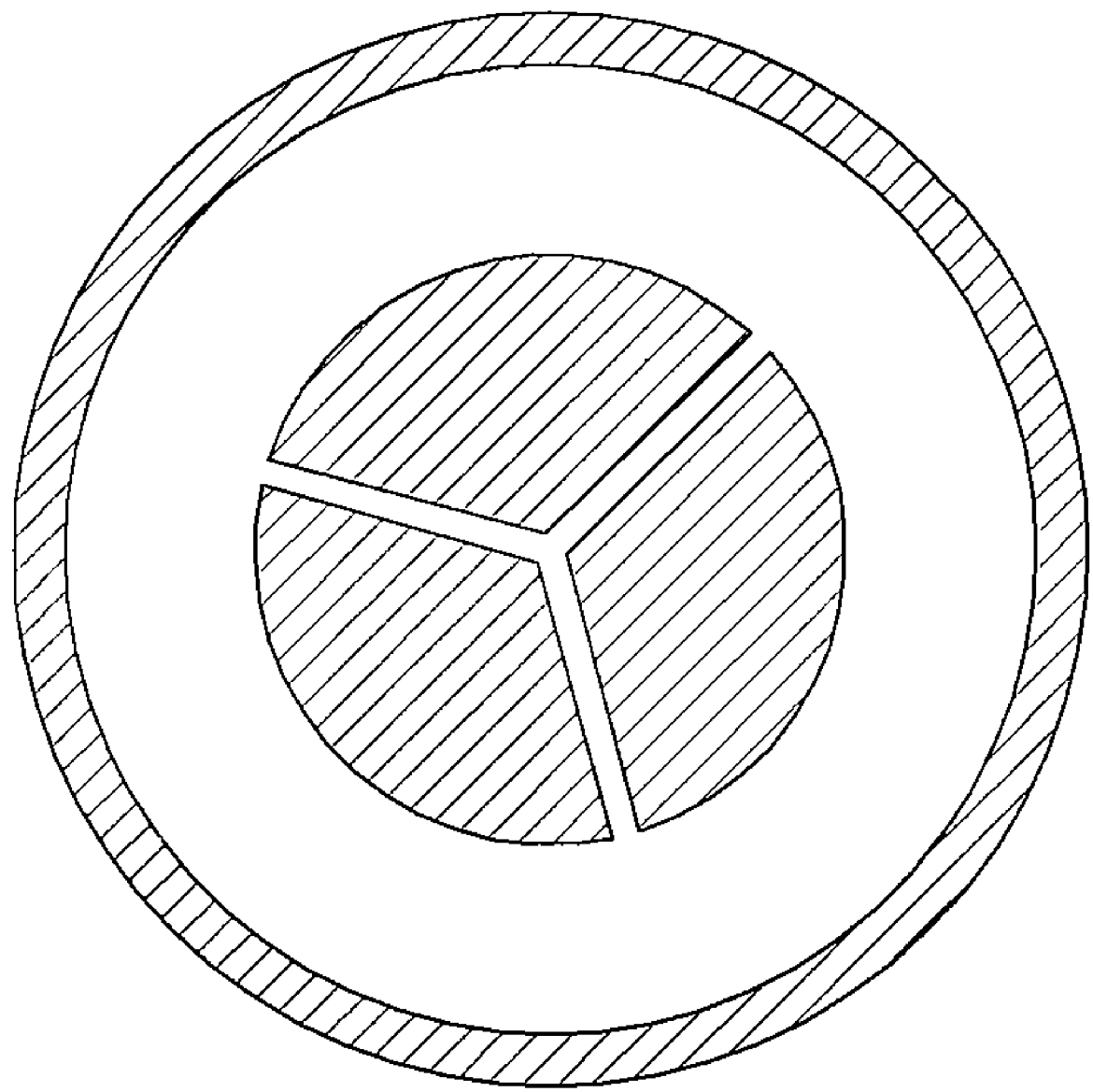
Figure 5C:
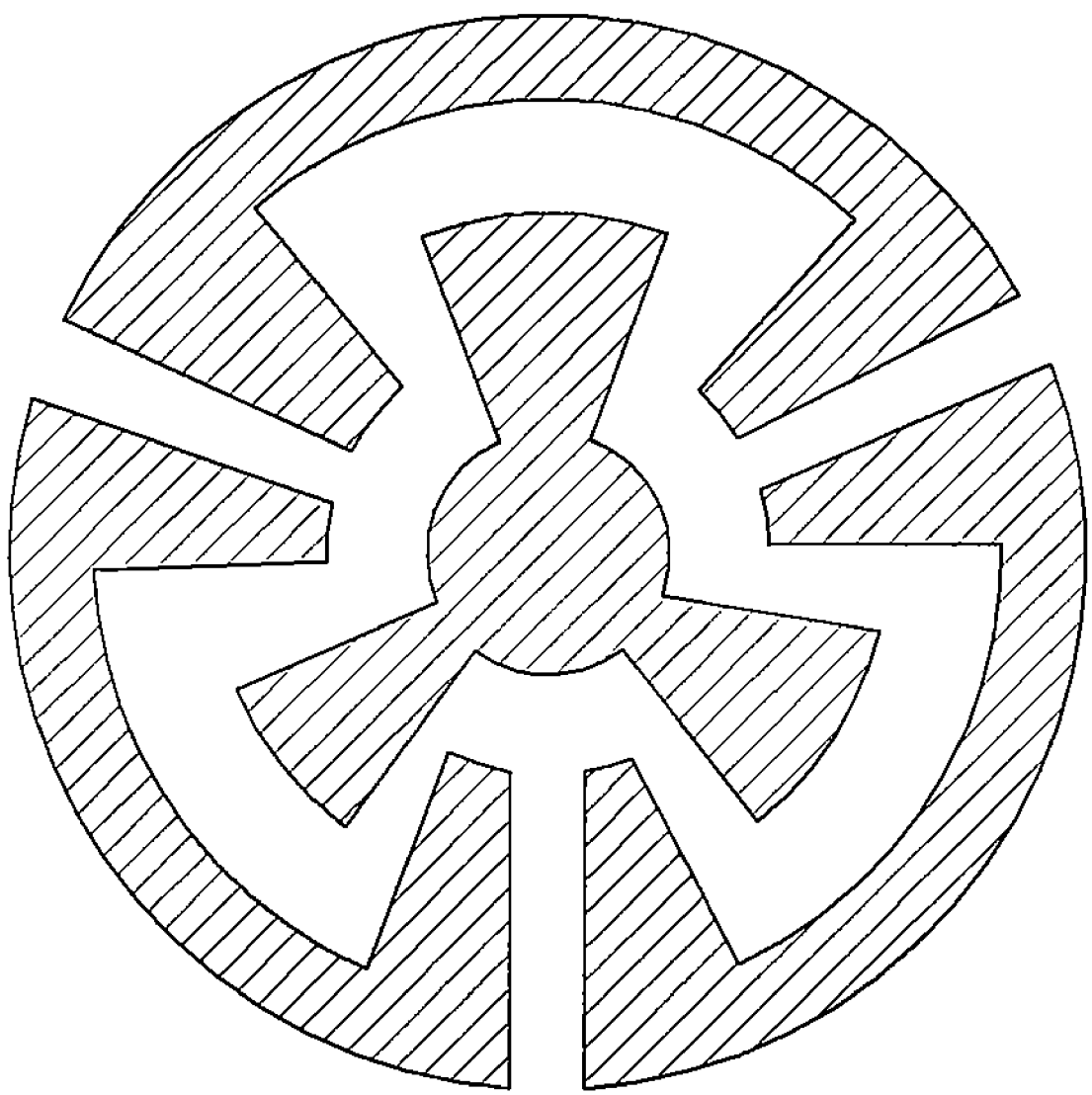
Figure 5D:
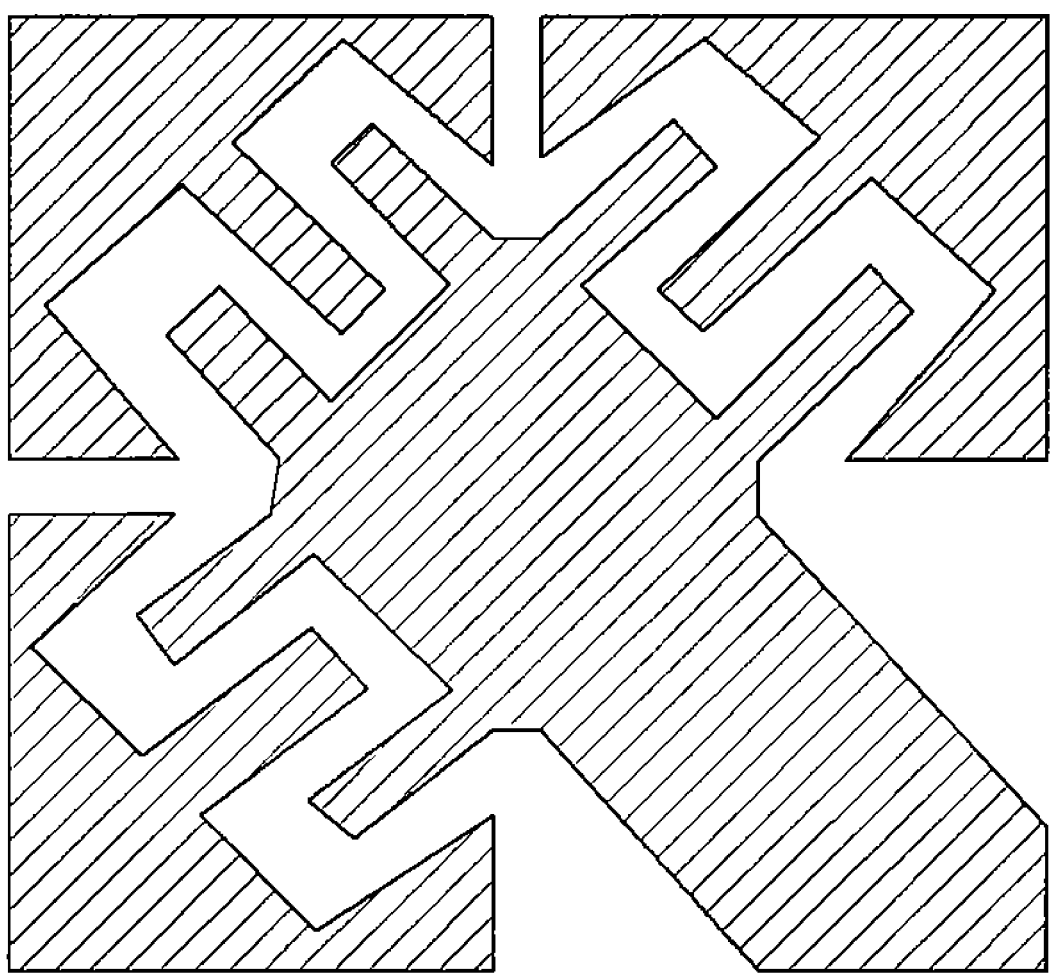

Some composition examples of an unit electrode pad having the above advantages are illustrated through FIGS. 5A to 5D. Nevertheless, the case of FIG. 5D is not circularly symmetrical.

Here, each of the unit electrode pads forms the smallest unit for detecting a specific location where physical contact occurs that is distinguished from other unit electrode pads. Therefore, it shall be apparent that the number of the unit electrode pads can be prepared enough to completely cover the size of a specific area that is needed for detecting a contact location and a contact force, and the number of the unit electrode pads can be varied in accordance with required design specifications, for example, a degree of sensing sensitivity and resolution. One example of arranging the unit electrode pads is illustrated in FIG. 3A.

Figure 3A:
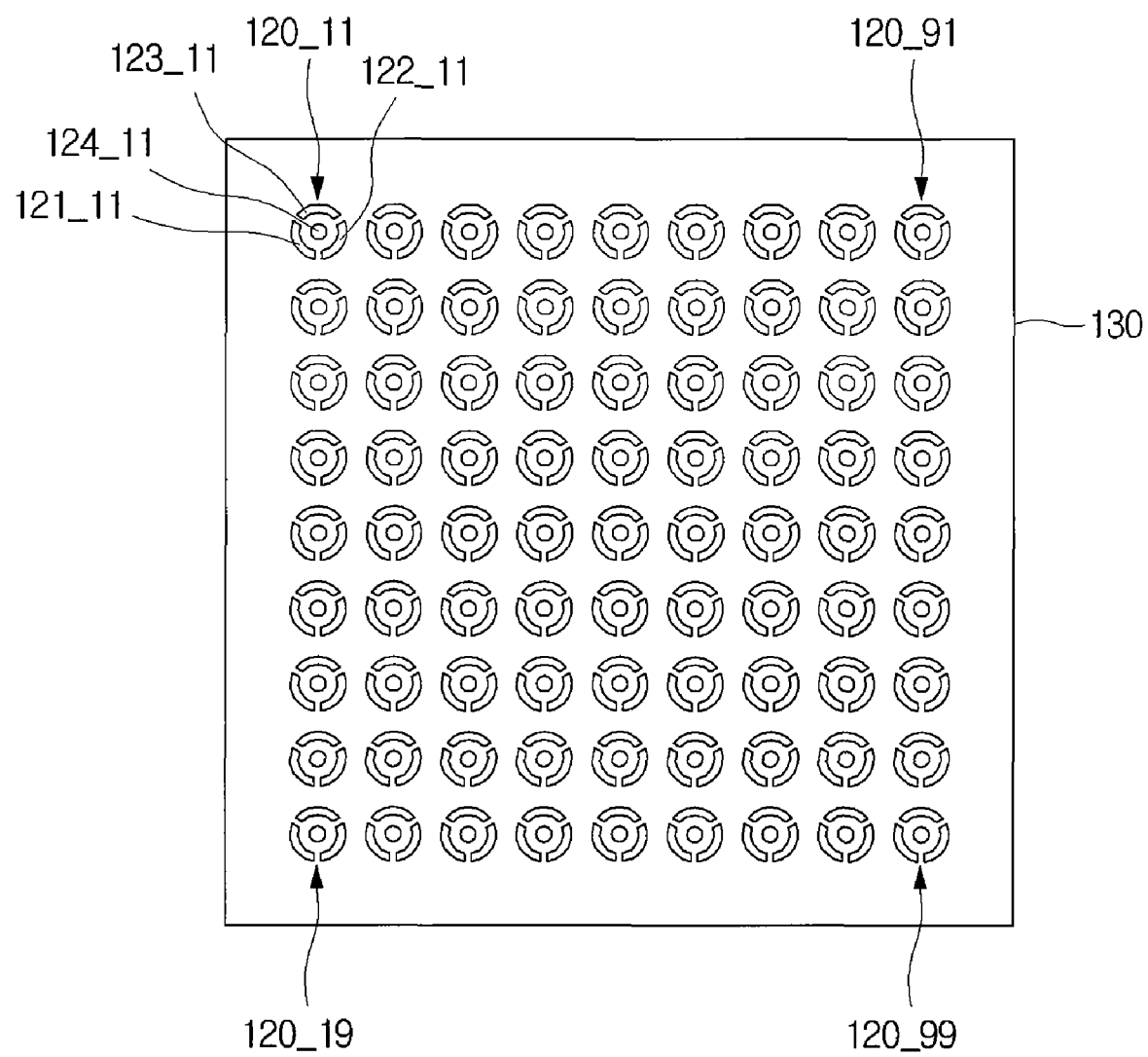
FIG. 3A illustrates an example of an electrode layer in a tactile sensor in accordance with an embodiment of the present invention.

Referring to FIG. 3A, a total of 81 unit electrode pads, spaced at equal distances, having the form of FIG. 4 is arranged in an 9×9 matrix configuration. In other words, a total of 81 unit electrode pads spaced at equal distances is arranged from a unit electrode pad 120_11 (i.e., consisting of $1^{st}$ to $4^{th}$ electrodes 121_11 to 124_11) in a 1st row and a 1st column through a unit electrode pad 120_19 in a 9th row and the 1st column and a unit electrode pad 120_91 in the 1st row and a 9th column, to a unit electrode pad 120_99 in the 9th row and the 9th column.

Nevertheless, the unit electrode pads do not need to be evenly arranged in an N×N matrix configuration, like the example described above. The embodiment described above is just an example that shows an efficient way of covering the entire sensing area by arranging the unit electrode pads in a 2 dimensional configuration.

Next, as an important part of the tactile sensor in accordance with the present invention, the compositions of the sensing circuit and a corresponding circuit pattern being implemented on a circuit board will be described in detail by referring to FIGS. 3B to 3E and 6A to 8C.

A total of four electrodes 121, 122, 123 and 124 forming the unit electrode pad 120 is connected with a total of four circuit patterns (i.e., an x-axis circuit pattern, an y-axis circuit pattern, a sectional circuit pattern and a common circuit pattern) being implemented on a circuit board 110, respectively.

In the present description, the $1^{st}$ electrode 121 of the unit electrode pad 120 is used to be connected with the x-axis circuit pattern implemented on the circuit board 110, the $2^{nd}$ electrode 122 is used to be connected with the y-axis circuit pattern, the $3^{rd}$ electrode 123 is used to be connected with the sectional circuit pattern, and the $4^{th}$ electrode 124 is used to be connected with the common circuit pattern, as illustrated in FIGS. 3B to 3E. However, it shall be apparent that another method other than the one described above can be employed.

Furthermore, in the present description, it shall be assumed that each of the four electrodes being implemented on the circuit board 110 is formed on a different layer (reference numerals 111 to 114 in FIG. 1 and FIGS. 3B to 3E), as illustrated in FIGS. 3B to 3E. However, it shall be apparent that another method other than the one described above can be employed. Nevertheless, in order to make the final tactile sensor small, to prevent the possibility of hooking up between different circuit patterns, and to reduce the complexity of wiring, it may be desirable to have each of the four circuit patterns formed on a different layer in the circuit board 110.

Figure 3B:
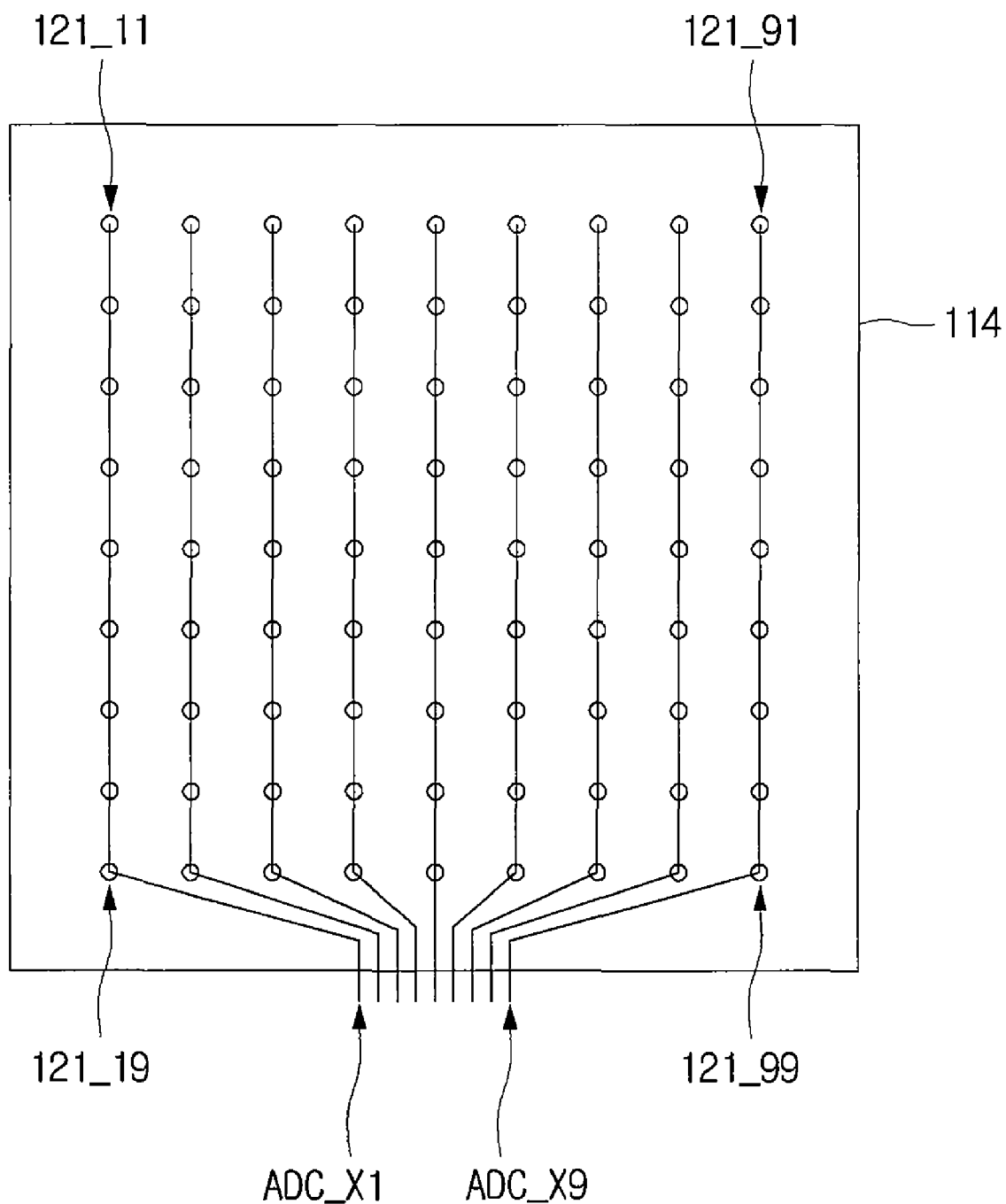
FIG. 3B illustrates an example of an X axial circuit pattern implemented on a circuit board in a tactile sensor in accordance with an embodiment of the present invention.

A circuit pattern (hereinafter, it is called the x-axis circuit pattern) for detecting an x-axis coordinate of a contact location is implemented by connecting each of unit electrode pads in a same column among the unit electrode pads arranged in a 2D configuration, as illustrated in FIG. 3B.

In other words, by connecting each of $1^{st}$ electrodes 121_11 to 121_19 of the unit electrode pads in a $1^{st}$ column among the total of 81 unit electrode pads arranged in an 9×9 matrix configuration to one signal line, changes in voltage can be detected by ADC_X1 through the signal line when physical contact occurs at any one of the unit electrode pads, consisting of a unit electrode pad in a $1^{st}$ row and the $1^{st}$ column to a unit electrode pad in a $9^{th}$ row and the $1^{st}$ column. The same principle is applied for another column. Even in the case of the unit electrode pads in a $9^{th}$ column, each of $1^{st}$ electrodes 121_91 to 121_99 is connected by another signal line, so that changes in voltage can be detected by ADC_X9 when contact occurs at the corresponding column.

Similarly as described above, a circuit pattern (hereinafter, it is called the y-axis circuit pattern) for detecting an y-axis coordinate of a contact location is implemented by connecting each of unit electrode pads in a same row among the unit electrode pads arranged in a 2D configuration, as illustrated in FIG. 3C.

In other words, by connecting each of $2^{nd}$ electrodes 122_11 to 122_91 of the unit electrode pads in a $1^{st}$ row among the total of 81 unit electrode pads arranged in an 9×9 matrix configuration to one signal line, changes in voltage can be detected by ADC_Y1 through the signal line when physical contact occurs at any one of the unit electrode pads, consisting of a unit electrode pad in the $1^{st}$ row and a $1^{st}$ column to a unit electrode pad in the $1^{st}$ row and a $9^{th}$ column. The same principle is applied for another row. Even in the case of the unit electrode pads in a $9^{th}$ row, each of $2^{nd}$ electrodes 122_91 to 122_99 is connected by another signal line, so that changes in voltage can be detected by ADC_Y9 when contact occurs at the corresponding row.

In the conventional technologies, even considering the number of directly required signal lines in order to calculate an x-axis coordinate and an y-axis coordinate of a contact location, each of the electrode pads, which is a smallest unit for detecting a contact location, needs to be equipped with at least two signal lines. In the conventional technologies, as a result, an increasing number of signal lines are needed, and thus the complexity of wiring in a circuit board has increased. Likewise, when assuming the same condition described above, it is clear that at least 162 signal lines (81 unit electrode pads×2 signal lines per each unit electrode pad) are needed for only calculating an x-axis coordinate and an y-axis coordinate for the total of 81 unit electrode pads in accordance with the conventional technologies.

In comparison, the present invention only required a total of 18 signal lines, i.e., 9 for connecting a same column and 9 for connecting a same row, for detecting an x-axis coordinate and an y-axis coordinate in the same condition described above.

Figure 3D:
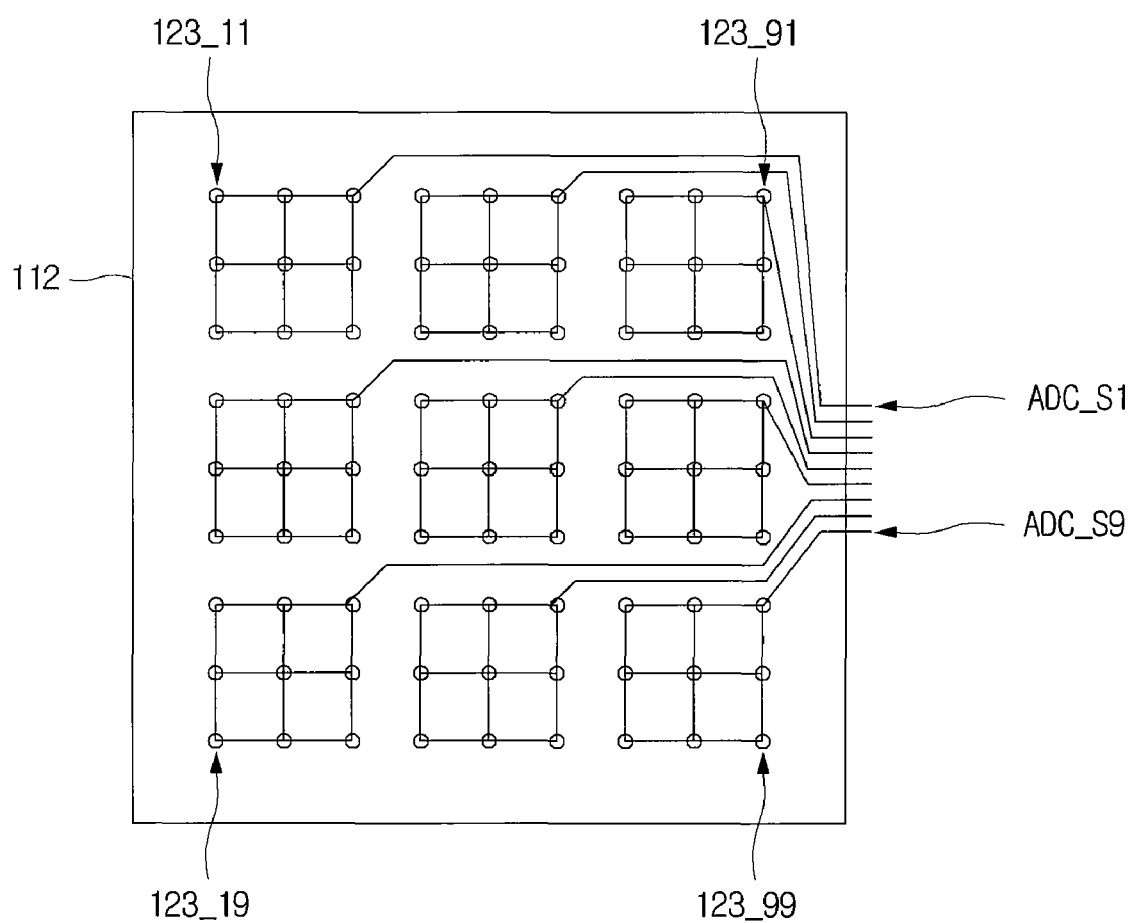
FIG. 3D illustrates an example of a sectional circuit pattern implemented on a circuit board in a tactile sensor in accordance with an embodiment of the present invention.

Illustrated in FIG. 3D is a circuit pattern (hereinafter, it is called the sectional circuit pattern) that is implemented by connecting each of unit electrode pads in a same section among the unit electrode pads arranged in a 2D configuration, after imaginatively dividing the entire area, in which the unit electrode pads are 2 dimensionally arranged, into areas of predetermined size (hereinafter, it is called a section).

In FIG. 3D, for example, the entire unit electrode pads arranged in an 9×9 matrix configuration are divided into a total of 9 sections, each of which has an 3×3 matrix unit (or area). Therefore, each of reference numerals 123_11, 123_19, 123_91 and 123_99, which are in a same row and a same column, belongs to a different section. In this case, as the principle is similar to those described above, changes in voltage can be detected by ADC_S1 to ADC_S9 by connecting all unit electrode pads in a same section to one signal line, when contact occurs at any one of the unit electrode pads belonging to the corresponding section.

In the case described above, it is desirable to have each of the sections with an equal area. Moreover, the size of one section can be set to correspond to an effective contact area on an object being contacted with a surface of the sensor. In case a human hand or a touch pen is used as a tool to contact, for example, the size of one section can be set such that it has a value greater than or equal to an average effective area when an end part of the human hand or the touch pen touches the surface of the sensor. In another case, when a key pad or an array of icons is displayed on a touch-screen, the size of one section can be set such that it has a value equal to an area occupied by the key pad or the array of icons within the display area. Besides the ones described above, it shall be apparent that it can be changed variously.

The reason why the sectional circuit pattern described above is required in the present invention is to implement the capability to sense multiple touch points as well as to increase the accuracy of the sensing by minimizing an error of sensing the touch points, when a plurality of touches (i.e., when contacts occurs at 2 locations or more) occur. This will be described by referring to FIGS. 8A to 8C below.

First, it shall be assumed that the plurality of touches occur at an unit electrode pad in a $3^{rd}$ row and a $5^{th}$ column and an unit electrode pad in a $6^{th}$ row and a $8^{th}$ column (contact points 1 and 2 illustrated in FIGS. 8A to 8C) among the total of 81 unit electrode pads arranged in an 9×9 matrix configuration.

In this case, changes in voltage can be detected by ADC_X5 and ADC_X8 through each corresponding signal line of the $5^{th}$ column and the $8^{th}$ column in the x-axis circuit pattern, and at the same time changes in voltage can be detected by ADC_Y3 and ADC_Y6 through each corresponding signal line of the $3^{rd}$ row and the $6^{th}$ row in the y-axis circuit pattern.

Therefore, when the plurality of touches occur, it may be difficult to sense the touch points precisely by using the x-axis circuit pattern and the y-axis circuit pattern only (reference to sensing error points in FIGS. 8A to 8C). In accordance with a combination of ADC_X5, ADC_X8 and ADC_Y3, ADC_Y6, a number of cases exist at points where no contact occurred (i.e., a unit electrode pad in the $3^{rd}$ row and the $8^{th}$ column and a unit electrode pad in the $6^{th}$ row and the $5^{th}$ column) other than the points at which the contacts occurred (i.e., a unit electrode pad in the $3^{rd}$ row and the $5^{th}$ column and a unit electrode pad in the $6^{th}$ row and the $8^{th}$ column).

Unlike the conventional technologies, the present invention further includes the sectional circuit pattern in addition to the x-axis circuit pattern and the y-axis circuit pattern, implementing the capability to sense the multiple touch points. Referring to FIG. 8C, for example, the contact, occurred at the unit electrode pad in the $3^{rd}$ row and the $5^{th}$ column, can be detected by ADC_S2 through a change in voltage by the sectional circuit pattern, and the contact, occurred at the unit electrode pad in the $6^{th}$ row and the $8^{th}$ column, can be detected by ADC_S6 through a change in voltage by the sectional circuit pattern. On the other hand, changes in voltage cannot be detected through ADC_S3 and ADC_S5, of which each is connected to a corresponding section where the unit electrode pads in the $3^{rd}$ row and the $8^{th}$ column and the unit electrode pad in the $6^{th}$ row and the $5^{th}$ column are positioned, respectively. Therefore, the present invention can implement the tactile sensor that has the capability to sense the location of multiple touch points.

According to the present invention as set forth above, the capability to sense the multiple touch points can be implemented by simplifying the structure of signal lines through the x-axis circuit pattern and the y-axis circuit pattern implemented in the circuit board 110 an well as by further employing the sectional circuit pattern.

Figure 3E:
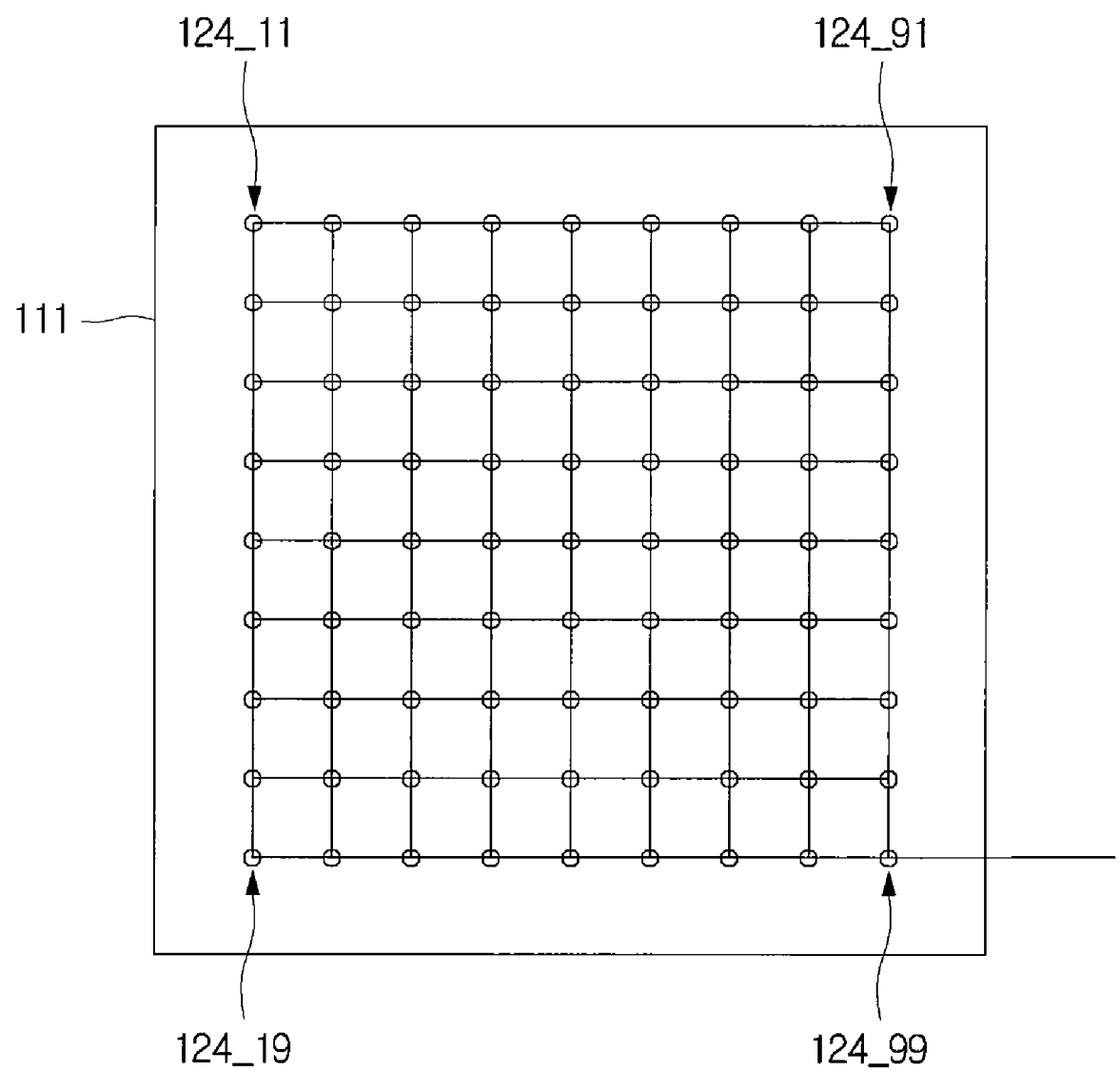
FIG. 3E illustrates an example of a common circuit pattern implemented on a circuit board in a tactile sensor in accordance with an embodiment of the present invention.

Illustrated in FIG. 3E is a common circuit pattern that connects all the remaining of any ones 124_11 to 124_99 other than the three electrodes being connected with the x-axis, y-axis and sectional circuit patterns described above among a total of 4 electrodes forming one unit electrode pad.

Generally, the common circuit pattern illustrated in FIG. 3E can be connected with a ground. That is, when power (reference to Vcc in FIGS. 6A to 6C) as a common voltage is supplied to the $1^{st}$ to $3^{rd}$ electrodes 121, 122 and 123, of which each is connected with the x-axis circuit pattern, the y-axis circuit pattern and the sectional circuit pattern (in FIGS. 3B to 3D), respectively, the $4^{th}$ electrode 124 being connected with the common circuit pattern can be grounded. Of course, it can be the contrary (reference to FIGS. 7A to 7C).

Two examples of actual implementation of the sensing circuit corresponding to features of the circuit patterns described above will be described respectively by referring to FIGS. 6A to 7C. However, the sensing circuits being described in FIGS. 6A to 7C are only some examples, and it shall be apparent that many implementations other than those set forth above can be found.

It is apparent that FIGS. 6A to 7C only represent a 3×3 minor matrix configuration forming the parts of each of the circuit patterns in a 9×9 matrix configuration shown in FIGS. 3B to 3D.

Figure 6A:
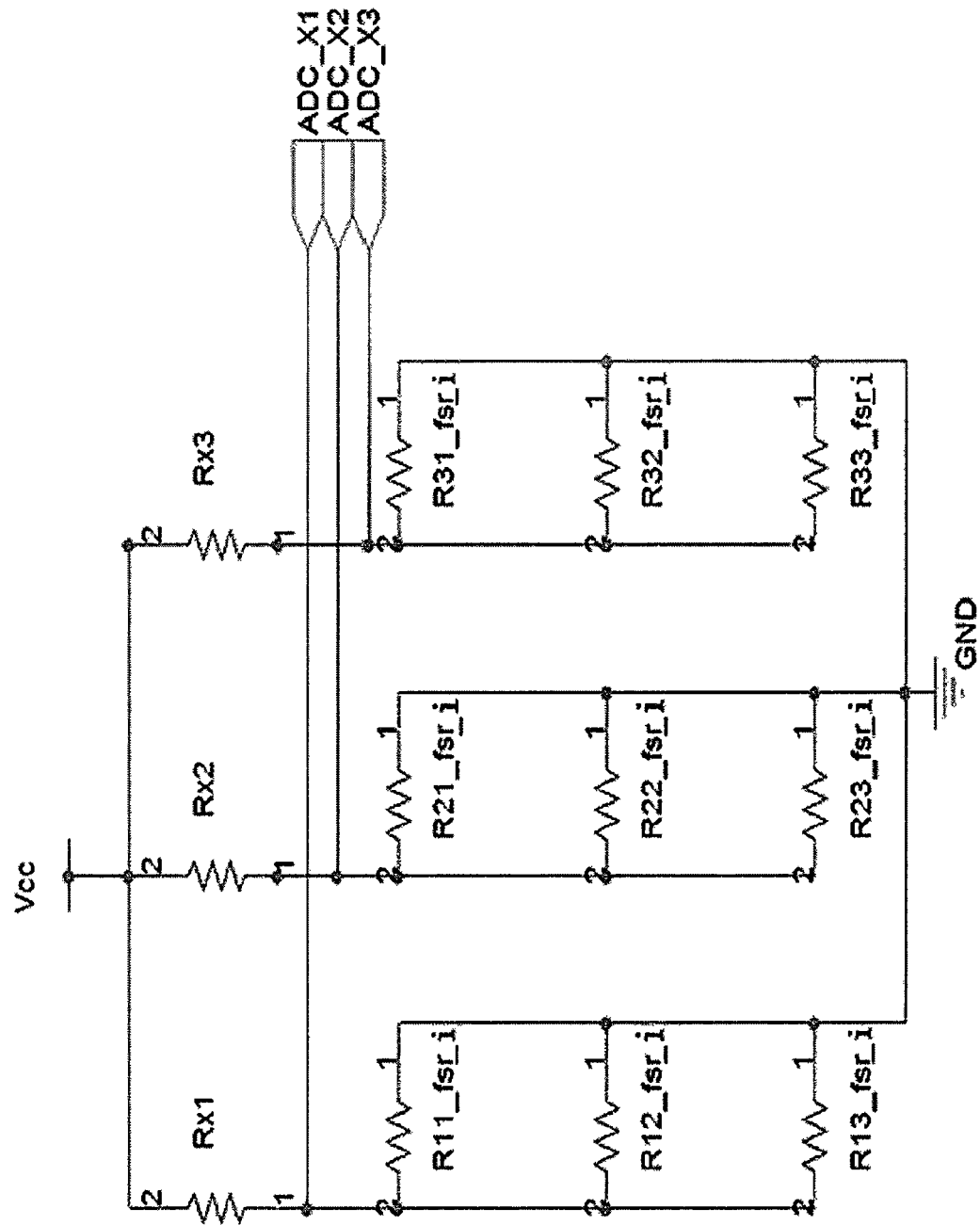
FIG. 6A illustrates an example of an actual sensing circuit for sensing an X axial coordinate of a contact area corresponding to FIG. 3B.
Figure 6B:
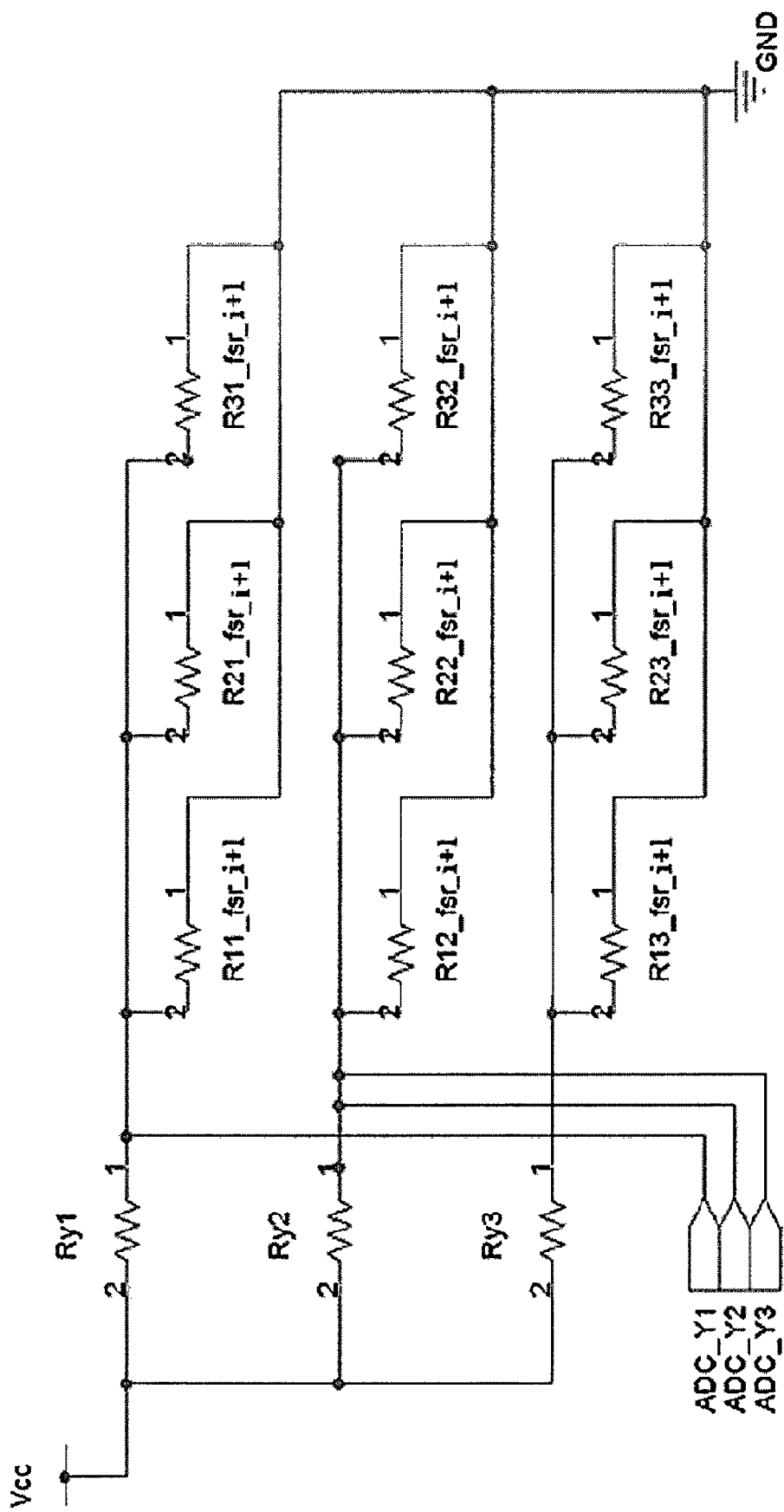
FIG. 6B illustrates an example of an actual sensing circuit for sensing a Y axial coordinate of a contact area corresponding to FIG. 3C.
Figure 6C:
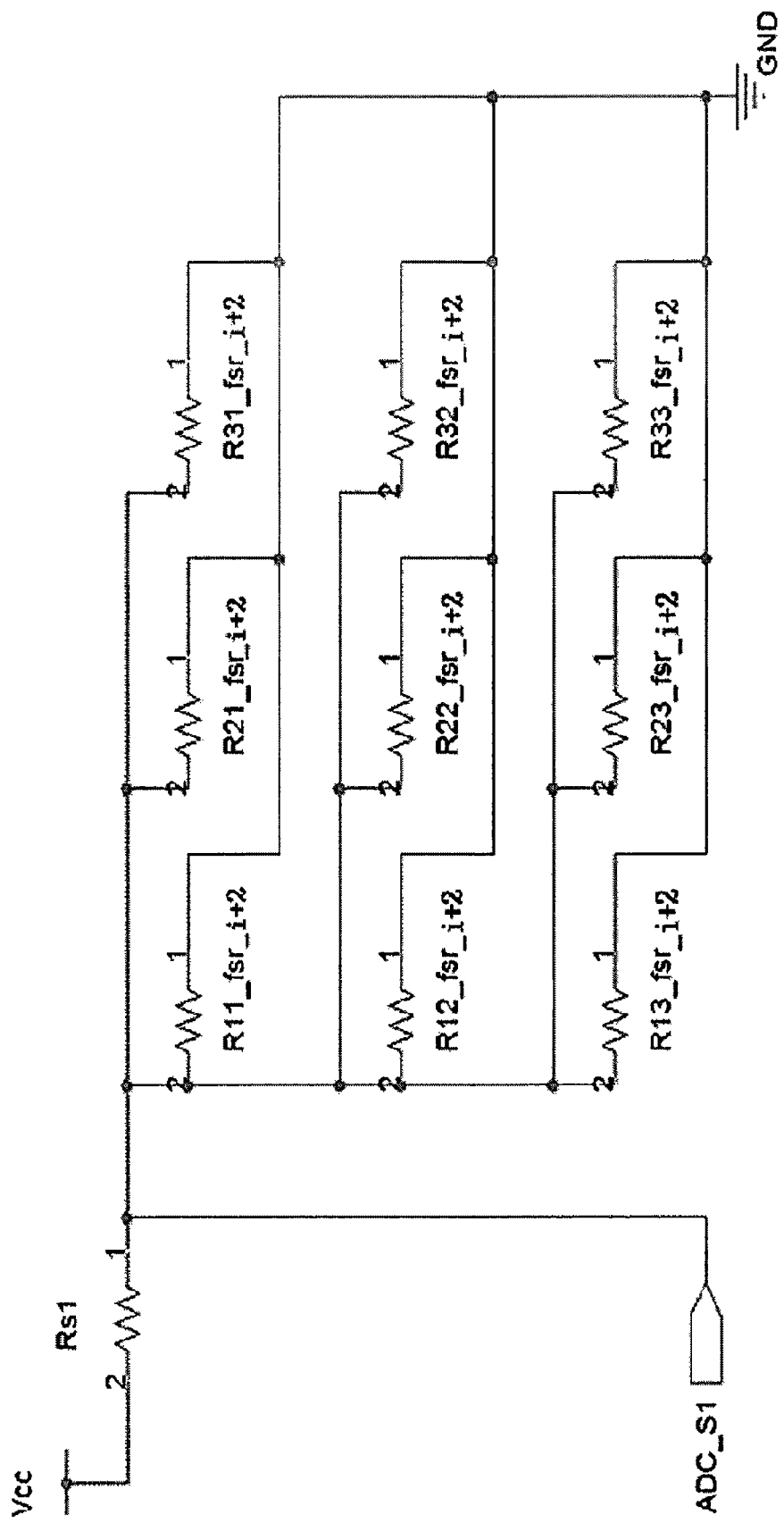
FIG. 6C illustrates an example of an actual sensing circuit for sensing a sectional contact area corresponding to FIG. 3D.
Figure 7A:
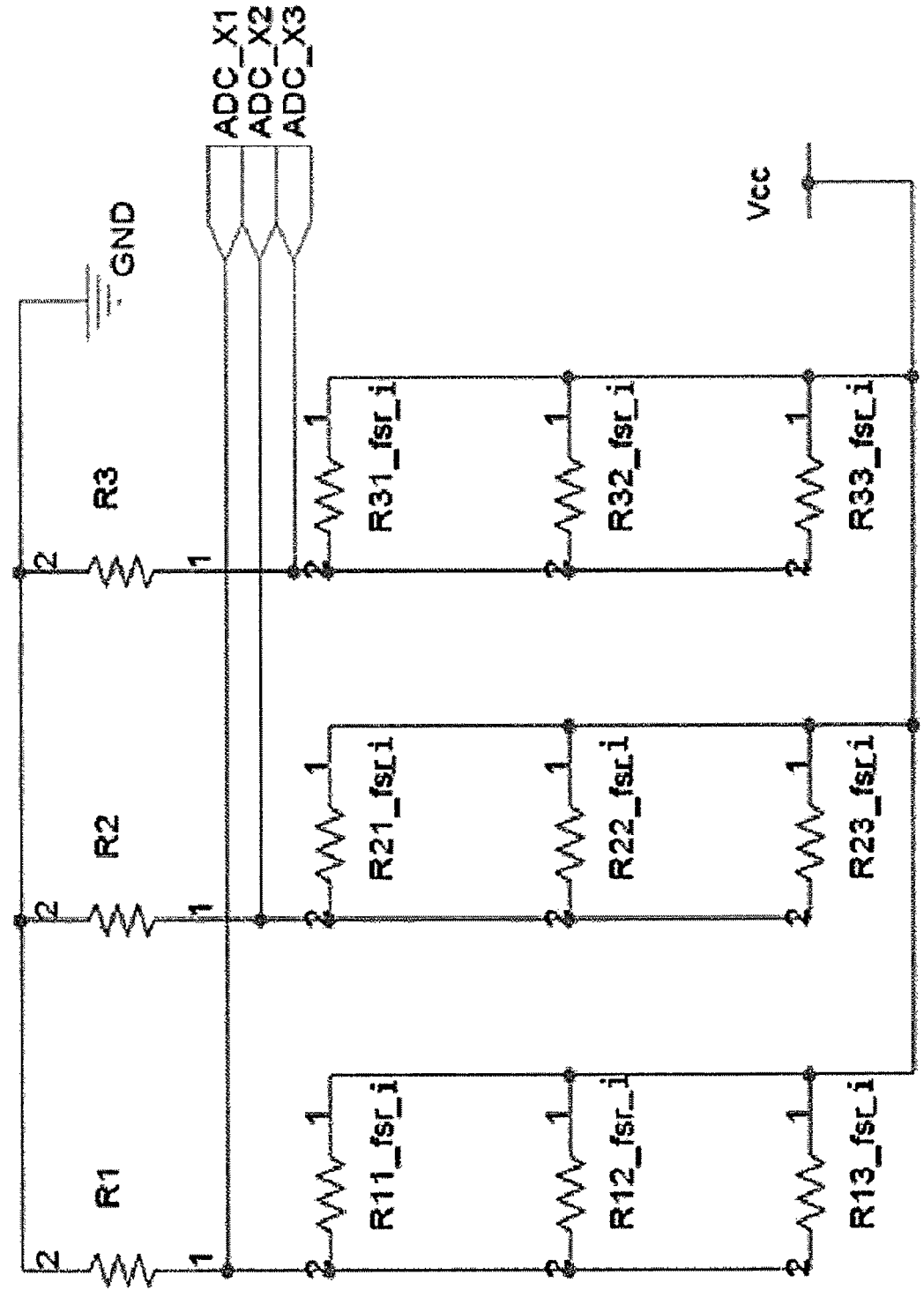
FIG. 7A illustrates another example of an actual sensing circuit for sensing an X axial coordinate of a contact area corresponding to FIG. 3B.
Figure 7B:
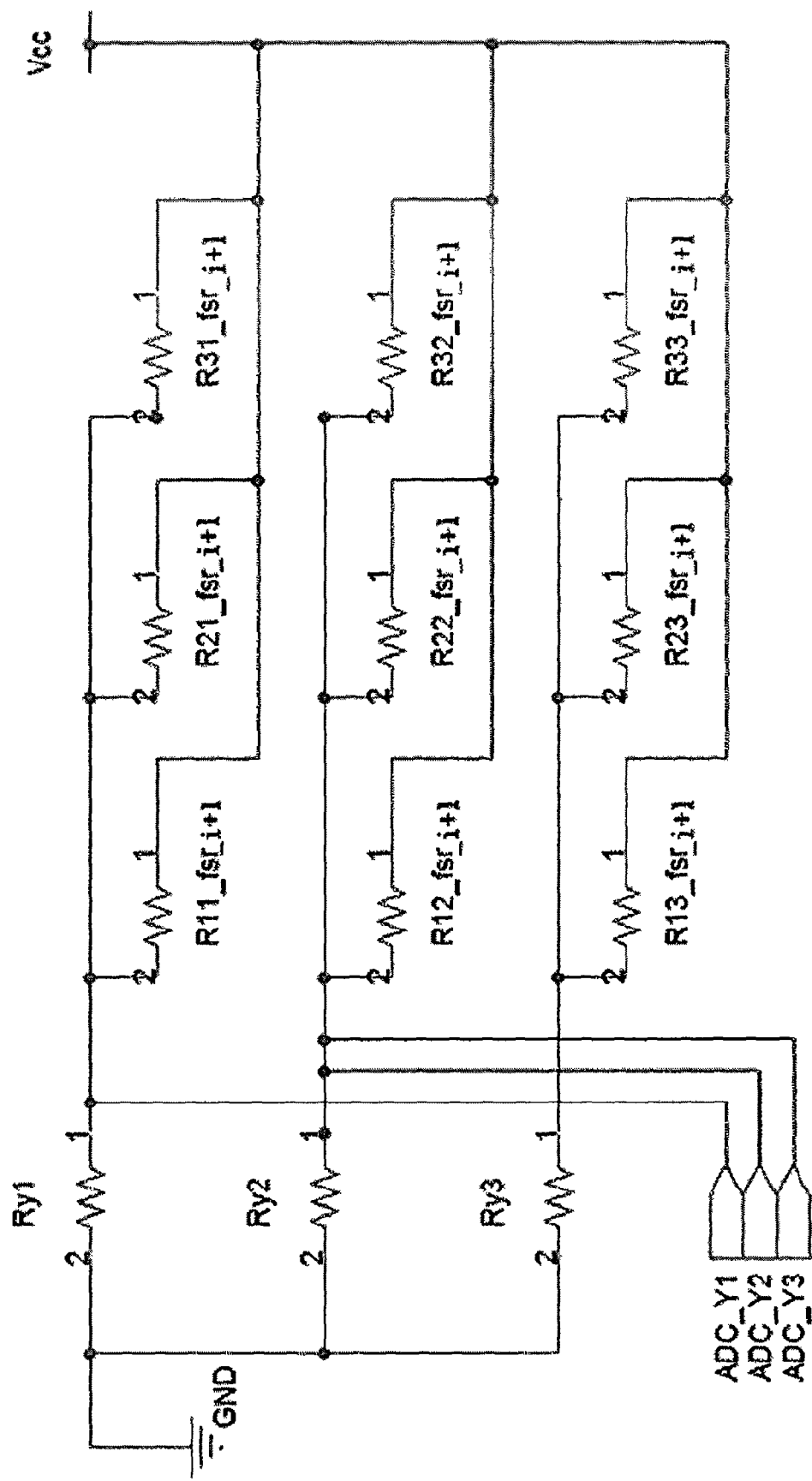
FIG. 7B illustrates another example of an actual sensing circuit for sensing a Y axial coordinate of a contact area corresponding to FIG. 3C.
Figure 7C:
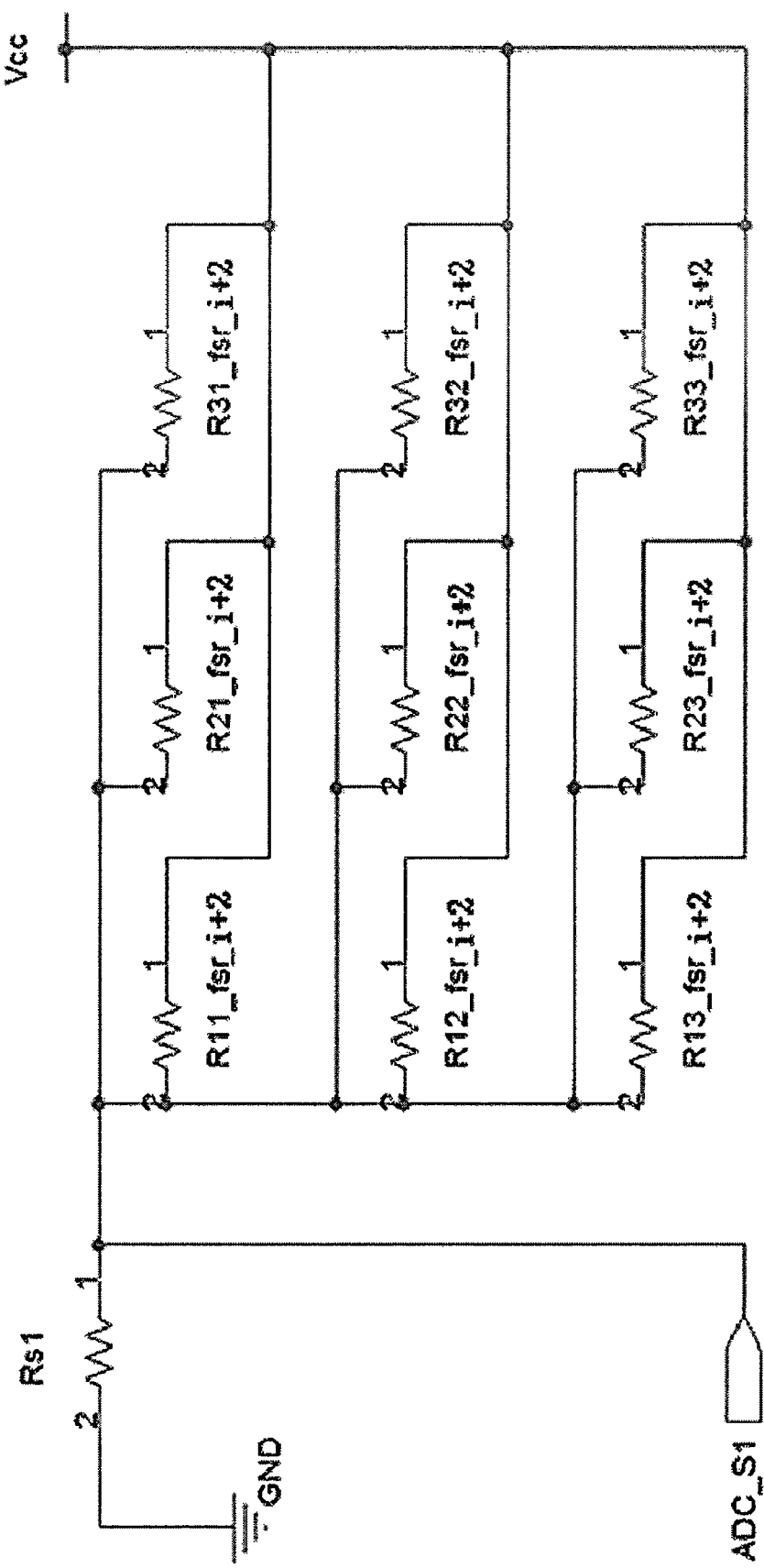
FIG. 7C illustrates another example of an actual sensing circuit for sensing a sectional contact area corresponding to FIG. 3D.

In other words, FIGS. 6A and 7A show one example and another example of actual implementation of the sensing circuit corresponding to the x-axis circuit pattern in the 3×3 minor matrix configuration, and FIGS. 6B and 7B show one example and another example of actual implementation of the sensing circuit corresponding to the y-axis circuit pattern in the 3×3 minor matrix configuration. Likewise, FIGS. 6C and 7C show one example and another example of actual implementation of the sensing circuit corresponding to the sectional circuit pattern in the 3×3 minor matrix configuration. Circuits shown in FIGS. 6A to 6C and circuits shown in FIGS. 7A to 7C are only different from each other to power (Vcc) and ground (GND) in which they are connected reversely. As a result, FIGS. 6A to 6C will be mainly described hereinafter.

Rx1, Rx2 and Rx3 shown in FIG. 6A, Ry1, Ry2 and Ry3 shown in FIG. 6B and Rs shown in FIG. 6C represent reference resistors for voltage distribution equipped for detecting an x-axis coordinate, an y-axis coordinate, a corresponding section, respectively. Moreover, as the sensor is contacted, a resistors such as Rxy_fsr_i represents an imaginary resistor that exists only between each of the electrodes when a corresponding unit electrode pad 120 to the contact location and the pressure sensing film 150 are contacted to each other (reference to FIG. 2A).

Accordingly, it shall be assumed that contact occurs at an unit electrode pad in a $1^{st}$ row and a $1^{st}$ column in FIGS. 6A to 6C, and thus the unit electrode pad in the $1^{st}$ row and the $1^{st}$ column is electrically connected only. In this case, R11_fsr_i in FIG. 6A, R11_fsr_i+1 in FIG. 6B and R11_fsr_i+2 in FIG. 6C are resistors that exist in fact, and other resistors other than the ones described above are resistors that are not real even though they are shown through the circuit drawings in FIGS. 6A to 6C, because no contact has occurred at a corresponding unit electrode pad. In other words, any other unit electrode pads other than the unit electrode pad in the $1^{st}$ row and the $1^{st}$ column are in a position that is not closed in fact.

In the case described above, while a voltage (Vcc) supplied is divided into parts by Rx1 and R11_fsr_i in FIG. 6A, a change in the voltage can be detected through ADC_X1 (AD converter). Likewise, a change in the voltage divided into parts by Ry1 and R11_fsr_i+1 can be detected through ADC_Y1 in FIG. 6B. Moreover, a change in the voltage divided into parts by Rs and R11_fsr_i+2 can be detected through ADC_S1 in FIG. 6C. As such, by knowing a row, a column and a section where a change in voltage occurred, the precise location of an unit electrode pad where contact occurred can be detected in accordance with the information above.

Not only is the location of an unit electrode pad where contact occurred known, but also the magnitude of a contact force (pressure) applied to the corresponding unit electrode pad can be detected in accordance with the circuit drawings described above. In case a pressure sensing film 150 is fabricated by using a force sensing resistor that lowers its resistance when pressure is raised, resistance caused by R11_fsr_i in FIG. 6A, for example, can be lowered while the vertical pressure increases. In this case, since a change in the voltage divided into parts by Rx1 and R11_fsr_i increases, the magnitude of pressure being applied vertically can be detected through the voltage change.

Although the embodiments have been described with a few unit electrode pads for better understanding, it shall be apparent that the number of unit electrode pads in a row and a column can be extended in accordance with the design specifications, and the size of the unit electrode pad itself can be also changed in the actual implementation.

According to the embodiments of the present invention as set forth above, the tactile sensor can simplify a pattern structure and have the capability to sense how hard one is touching and the presence and location of a touch.

The tactile sensor in accordance with the embodiments of the present invention also provides a tactile sensor that can implement the capability to sense multiple touch points while detecting the contact location.

While the spirit of the present invention has been described in detail with reference to particular embodiments, the embodiments are for illustrative purposes only and shall not limit the invention. It is to be appreciated that those skilled in the art can change or modify the embodiments without departing from the scope and spirit of the invention. As such, many embodiments other than those set forth above can be found in the appended claims.

What is claimed is:

1. A tactile sensor comprising:
   a circuit board;
   a plurality of unit electrode pads being arranged in a 2-dimensional configuration on one surface of an upper part of the circuit board; and
   a pressure sensing film being disposed on an upper part of the plurality of 2-dimensionally arranged unit electrode pads,
   wherein the circuit board comprises:
      a first circuit pattern configured for electrically connecting unit electrode pads disposed in a same column among the plurality of unit electrode pads arranged in a 2-dimensional configuration;
      a second circuit pattern configured for electrically connecting unit electrode pads disposed in a same row among the plurality of unit electrode pads arranged in a 2-dimensional configuration;
      a third circuit pattern configured for electrically connecting unit electrode pads disposed in each of sections among the plurality of unit electrode pads arranged in a 2-dimensional configuration, the entire area where the plurality of unit electrode pads are arranged is divided by the sections,
   wherein the first to the third circuit patterns are formed on layers different from one another in the circuit board.

2. The tactile sensor of claim 1, wherein the plurality of unit electrode pads include a first electrode to a fourth electrode that are electrically separated from one another,
   wherein any three selected from the group consisting of the first to fourth electrodes in the plurality of unit electrode pads are connected with the first to third circuit patterns, respectively.

3. The tactile sensor of claim 2, wherein, if electricity is supplied to the three electrodes connected with the first to third circuit patterns selected from the group consisting of the first to fourth electrodes constituting the unit electrode pad,
   a remaining electrode is grounded.

4. The tactile sensor of claim 3, wherein the circuit board further comprises
   a fourth circuit pattern electrically connecting electrodes being connected to a ground among the plurality of unit electrode pads arranged in a 2-dimensional configuration.

5. The tactile sensor of claim 2, wherein the three electrodes have the same shape and volume and are disposed by being apart from the remaining one by a same distance, the three electrodes being connected with the first to third circuit patterns among the first to fourth electrodes constituting the unit electrode pad.

6. The tactile sensor of claim 5, wherein the three electrodes are disposed such that the three electrodes are circularly symmetric with respect to the remaining electrode, the three electrodes being connected with the first to third circuit patterns among the first to fourth electrodes constituting the unit electrode pad.

7. The tactile sensor of claim 1, wherein the pressure sensing film is a force sensing resistor.

8. The tactile sensor of claim 1, wherein the unit electrode pads are arranged in an N×N matrix configuration on a same surface.

9. The tactile sensor of claim 1, wherein the plurality of unit electrode pads are arranged to be spaced evenly.

10. The tactile sensor of claim 1, wherein the entire area in which the plurality of unit electrode pads are arranged is virtually divided such that each of the sections has an equal area in order to implement the third circuit pattern.

11. The tactile sensor of claim 10, wherein an area of one of the sections is set to correspond to an effective contact area of an object being in contact with a surface of the pressure sensing film.

12. The tactile sensor of claim 1, wherein the pressure sensing film is disposed by a spacer to be spaced apart above the plurality of unit electrode pads, and the pressure sensing film is not in contact with the plurality of unit electrode pads.

13. The tactile sensor of claim 1, wherein the pressure sensing film is disposed to face the plurality of unit electrode pads directly, and the pressure sensing film is not in contact with the plurality of unit electrode pads.

* * * * *